(12) United States Patent
Small et al.

(10) Patent No.: US 12,078,550 B2
(45) Date of Patent: Sep. 3, 2024

(54) THERMOCHROMIC TEMPERATURE SENSOR

(71) Applicant: Chromatic Technologies, Inc., Colorado Springs, CO (US)

(72) Inventors: Lyle Small, Colorado Springs, CO (US); Timothy J. Owen, Colorado Springs, CO (US); Ruizheng Wang, Colorado Springs, CO (US); Medhanei Abraha, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 864 days.

(21) Appl. No.: 16/835,983

(22) Filed: Mar. 31, 2020

(65) Prior Publication Data

US 2020/0309607 A1    Oct. 1, 2020

Related U.S. Application Data

(60) Provisional application No. 62/908,986, filed on Oct. 1, 2019, provisional application No. 62/827,715, filed on Apr. 1, 2019.

(51) Int. Cl.
| | |
|---|---|
| *G01K 3/00* | (2006.01) |
| *C09B 9/00* | (2006.01) |
| *C09D 11/037* | (2014.01) |
| *C09D 11/50* | (2014.01) |
| *G01K 11/16* | (2021.01) |

(52) U.S. Cl.
CPC ............... *G01K 11/16* (2013.01); *C09B 9/00* (2013.01); *C09D 11/037* (2013.01); *C09D 11/50* (2013.01); *G01K 3/005* (2013.01)

(58) Field of Classification Search
CPC .......... G01K 3/005; G01K 11/16; C09B 9/00; C09D 11/037; C09D 11/50
See application file for complete search history.

(56) References Cited

U.S. PATENT DOCUMENTS

| | | |
|---|---|---|
| 5,281,570 A | 1/1994 | Hasegawa et al. |
| 5,558,699 A | 9/1996 | Nakashima et al. |
| 2004/0229754 A1 | 11/2004 | Fujita |

(Continued)

FOREIGN PATENT DOCUMENTS

JP    2006/188660 A    7/2006

OTHER PUBLICATIONS

PCT International Patent Application No. PCT/US20/26073; International Search Report and Written Opinion of the International Searching Authority dated Aug. 26, 2020, 16 pages.

(Continued)

*Primary Examiner* — Bijan Ahvazi
(74) *Attorney, Agent, or Firm* — Craig R. Miles; CR MILES P.C.

(57) ABSTRACT

A temperature sensor, and methods of making and using such a temperature sensor, whereby the temperature sensor includes a reversible thermochromic color-changing system having a dye, a developer, and a solvent. Upon exposure to a preselected temperature threshold, association or disassociation of the dye and the developer results in a visible color change. Further, the color-changing system includes a color-memory property which facilitates retention of the color change to effectively record exposure to the temperature threshold.

15 Claims, 5 Drawing Sheets

(56) References Cited

U.S. PATENT DOCUMENTS

2012/0141188 A1    6/2012  Fujita
2018/0120275 A1*  5/2018  Wang .......................... G01L 7/00
2019/0011318 A1*  1/2019  Wang ..................... B65D 85/72

OTHER PUBLICATIONS

Wikipedia. Leuco Dye. Website, https://en.wikipedia.org/w/index.php?title=Leuco_dye&oldid=8289934140, originally downloaded Jun. 16, 2020, 2 pages.
U.S. Appl. No. 62/908,986, filed Oct. 1, 2019.
U.S. Appl. No. 62/827,715, filed Apr. 1, 2019.

* cited by examiner

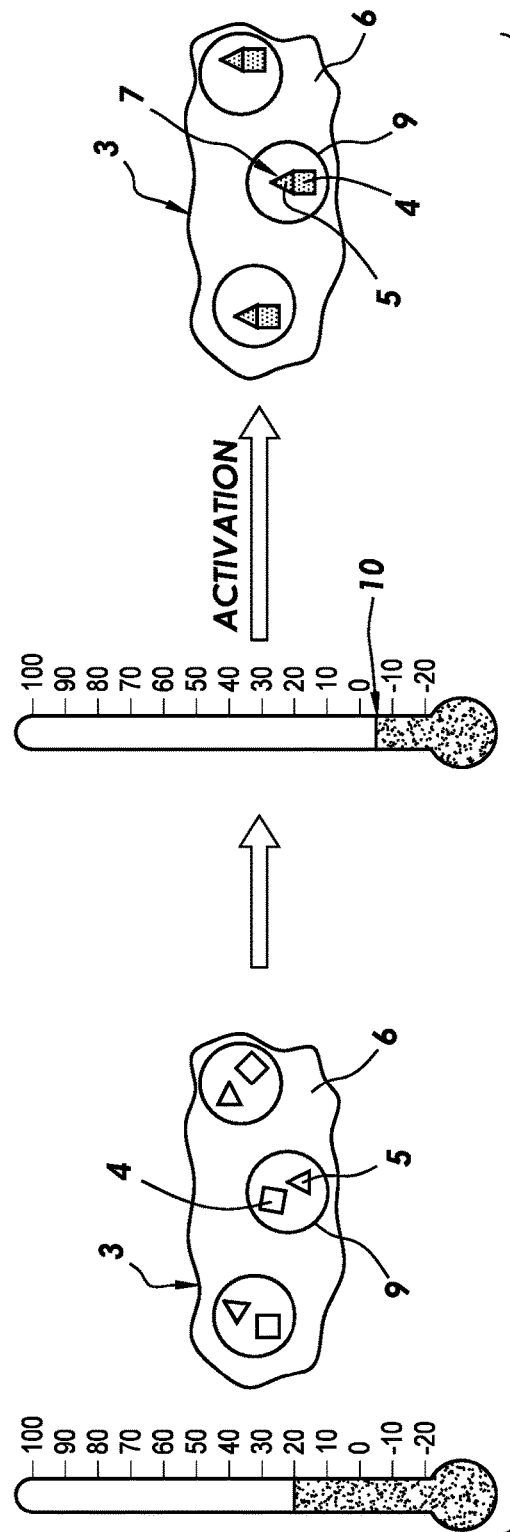
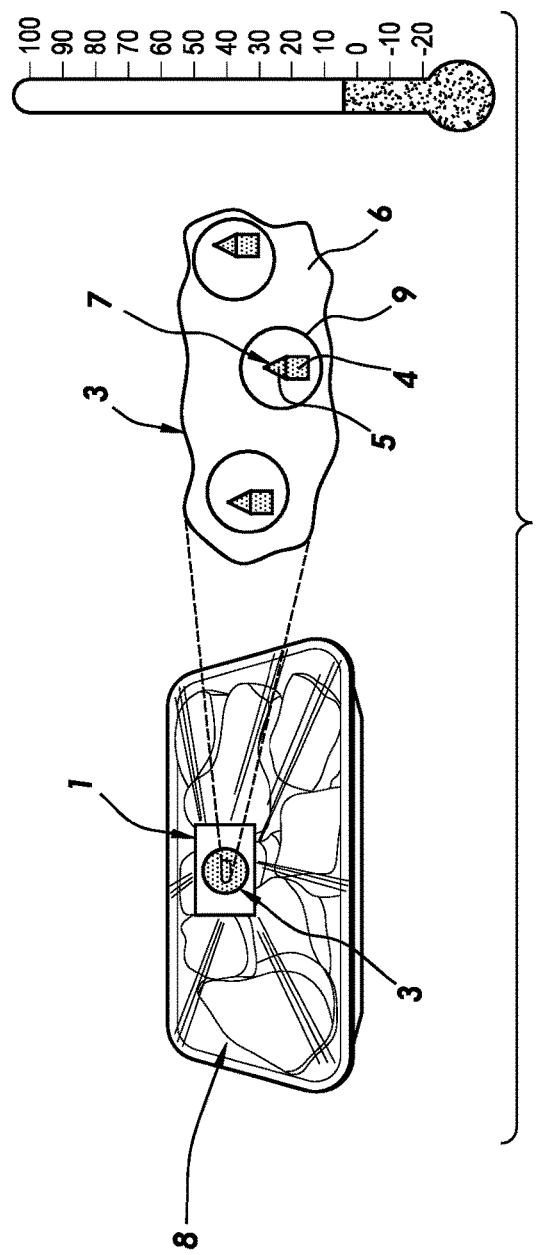

THERMOCHROMIC TEMPERATURE SENSOR

I. BACKGROUND

For temperature-sensitive products, it may be necessary to know whether the product has been exposed to a temperature below or above a threshold, as that temperature threshold may affect the product's quality, safety, etc. As but one illustrative example, if certain vaccines are subjected to temperatures below about 2° Celsius, the efficacy of the vaccine may be compromised. As another illustrative example, some foodstuffs, such as meat, should not be stored at temperatures above about 8° Celsius to ensure food safety.

Thus, a need exists for a temperature sensor which can (i) be reliably associated with a temperature-sensitive product and (ii) function to provide a direct indication of the thermal history thereof.

II. SUMMARY OF THE INVENTION

A broad object of a particular embodiment of the invention can be to provide a temperature sensor, and methods of making and using such a temperature sensor, whereby the temperature sensor includes a thermochromic color-changing system having a dye, a developer, and a solvent. Upon exposure to a preselected temperature threshold, association or disassociation of the dye and the developer results in a visible color change. Further, the color-changing system includes a color-memory property which facilitates retention of the color change to effectively record exposure to the temperature threshold.

Naturally, further objects of the invention are disclosed throughout other areas of the specification, drawings, and claims.

III. A BRIEF DESCRIPTION OF THE DRAWINGS

FIG. 2A shows an illustration of a high temperature indicator including a particular embodiment of the instant temperature sensor reliably associated with a temperature-sensitive product, such as a foodstuff, (i) prior to activation, whereby the dye and the developer are dissociated (as shown on the left), and (ii) following exposure to an activation temperature of about −5° Celsius, whereby this activation temperature facilitates association of the dye and the developer and corresponding formation of a visibly colored dye-developer complex (as shown on the right).

FIG. 2B shows an illustration of the particular embodiment of the temperature sensor shown in FIG. 2A prior to exposure to a preselected temperature threshold, whereby the color-changing system has not undergone a visible color change.

Figure 2C:
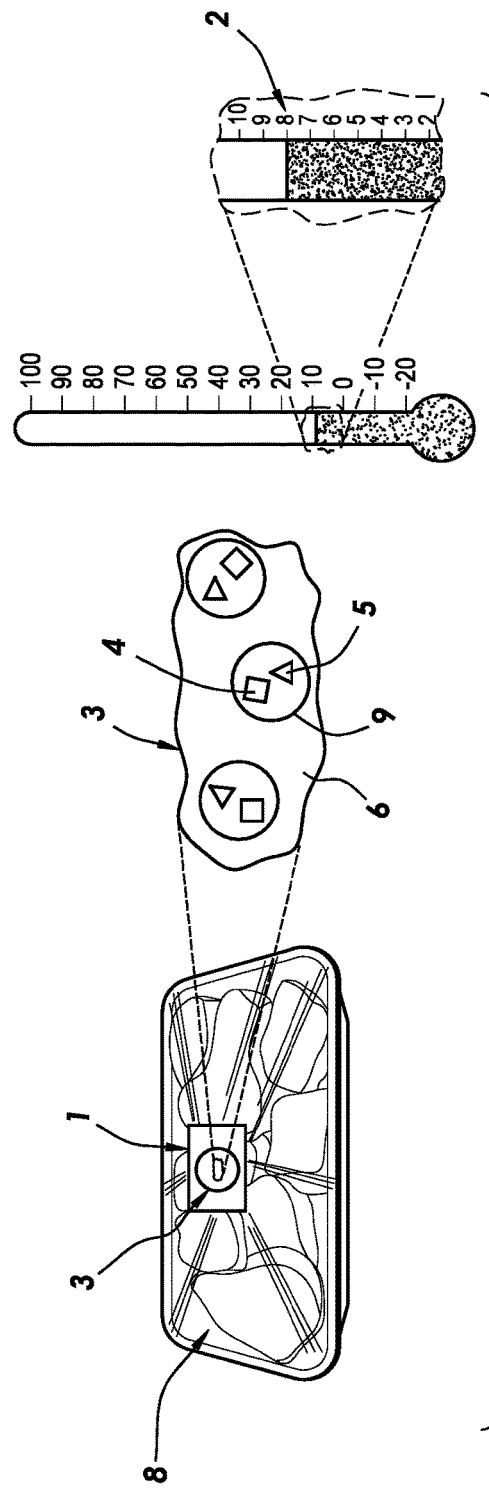

FIG. 2C shows an illustration of the particular embodiment of the temperature sensor shown in FIG. 2B following exposure to a temperature threshold of about 8° Celsius, whereby this temperature threshold facilitates dissociation of the dye and the developer to provide a visible color change from visibly colored to colorless.

Figure 2D:
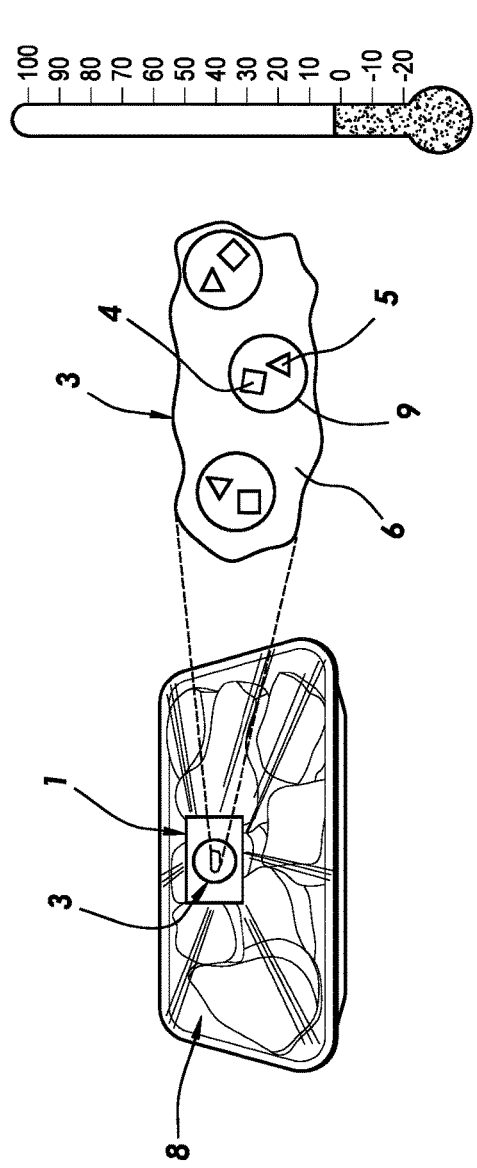

FIG. 2D shows an illustration of the particular embodiment of the temperature sensor shown in FIG. 2C following a decrease in temperature from the temperature threshold, whereby the color-changing system retains the visible color change.

Figure 3:
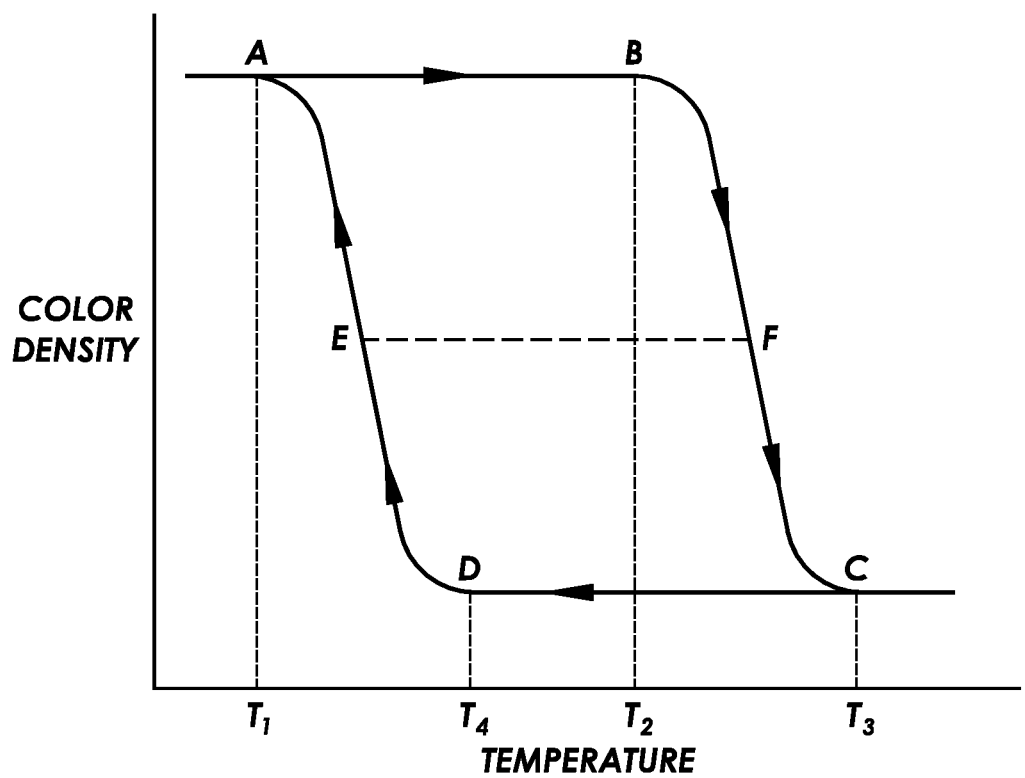

FIG. 3 shows an illustration of hysteresis characteristics of a particular embodiment of the instant color-changing system which has a color-memory property.

Figure 4A:
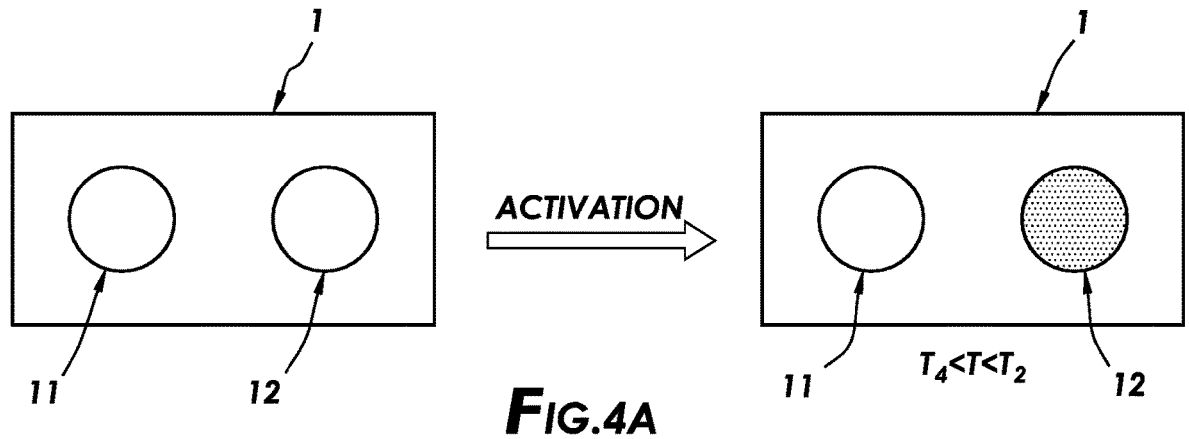

FIG. 4A shows an illustration of a dual temperature indicator including a particular embodiment of the instant temperature sensor, (i) prior to activation, whereby the dye and the developer of both the first and second color-changing systems are dissociated (as shown on the left), and (ii) following exposure to an activation temperature, whereby the activation temperature facilitates association of the dye and the developer of the second color-changing system and corresponding formation of a visibly colored dye-developer complex (as shown on the right).

Figure 4B:
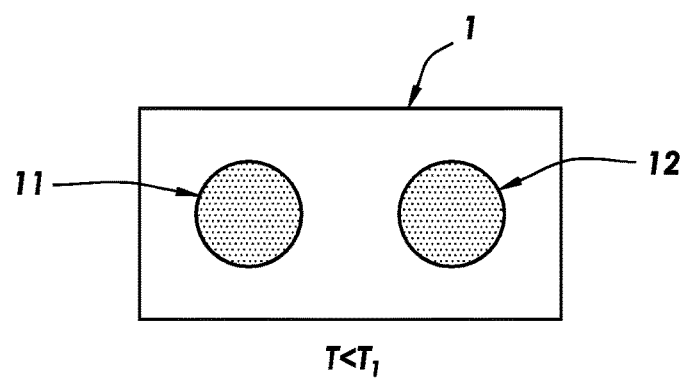

FIG. 4B shows an illustration of the particular embodiment of the temperature sensor shown in FIG. 4A following exposure to a low temperature threshold, whereby this temperature threshold facilitates association of the dye and the developer of the first color-changing system and corresponding formation of a visibly colored dye-developer complex to provide a visible color change from colorless to visibly colored; this color change can be retained upon an increase in temperature.

Figure 4C:
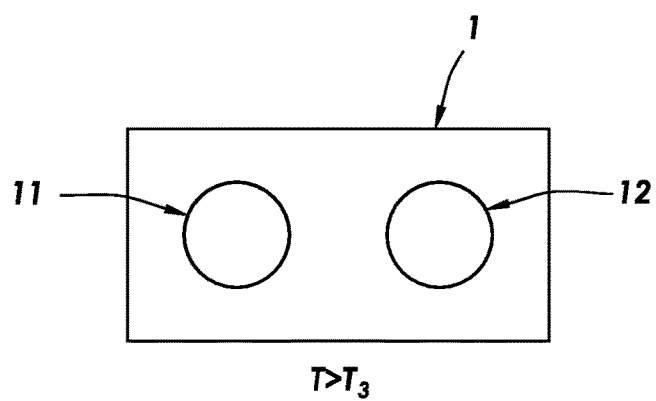

FIG. 4C shows an illustration of the particular embodiment of the temperature sensor shown in FIG. 4A following exposure to a high temperature threshold, whereby this temperature threshold facilitates dissociation of the dye and the developer of the second color-changing system to provide a visible color change from visibly colored to colorless; this color change can be retained upon a decrease in temperature.

IV. DETAILED DESCRIPTION OF THE PREFERRED EMBODIMENTS

Now referring primarily to FIG. 1A through FIG. 2D, which illustrate particular embodiments of the inventive temperature sensor (1) operative to provide an indication of exposure to a preselected temperature threshold (2), whereby the temperature sensor (1) includes a color-changing system (3) comprising: a dye (4), a developer (5), and a solvent (6). The developer (5) variably interacts with the dye (4) according to the temperature of the color-changing system (3), whereby upon exposure to the temperature threshold (2), association or disassociation of the dye (4) and the developer (5) results in a visible color change which can be visually observed (for example by a human, i.e. human-readable) or detected (for example by a human, i.e. human-readable, or a machine, i.e. machine-readable).

As to particular embodiments, the color-changing system (3) comprises a thermochromic color-changing system which can be susceptible to a temperature-modulated color change, whereby typically, a lower temperature will result in a colored state and a higher temperature will result in a colorless or substantially colorless state.

Figure 1A:
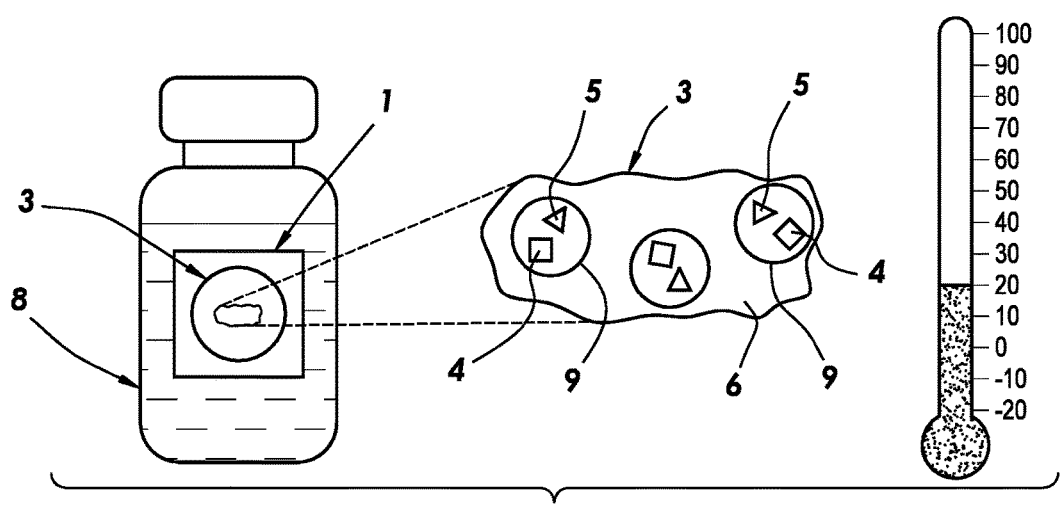
FIG. 1A shows an illustration of a low temperature indicator including a particular embodiment of the instant temperature sensor reliably associated with a temperature-sensitive product, such as a vaccine, prior to exposure to a preselected temperature threshold, whereby the dye and the developer are dissociated and the color-changing system has not undergone a visible color change.
Figure 1B:
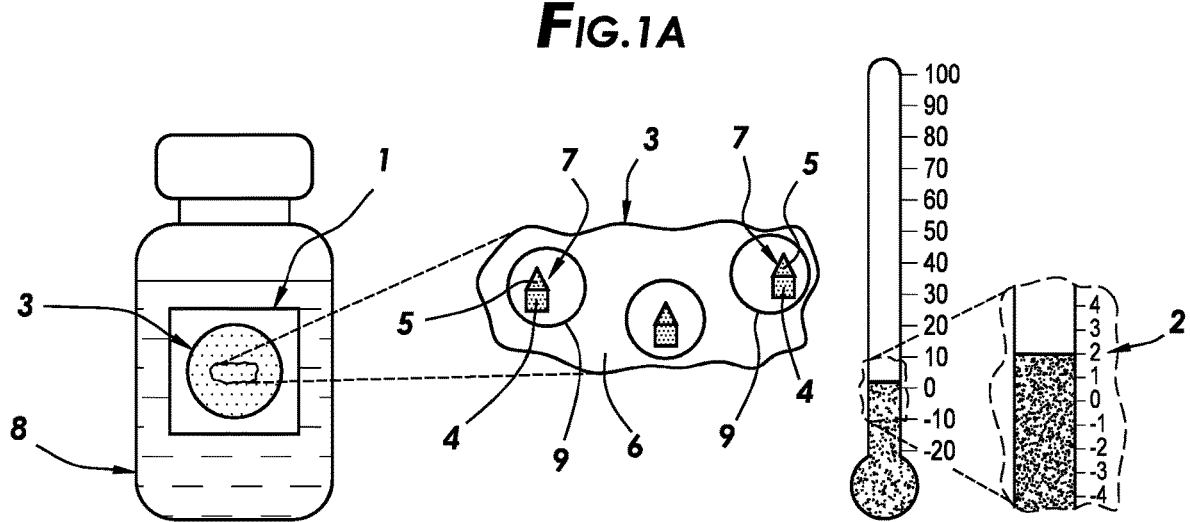
FIG. 1B shows an illustration of the particular embodiment of the temperature sensor shown in FIG. 1A following exposure to a temperature threshold of about 2° Celsius, whereby this temperature threshold facilitates association of the dye and the developer and corresponding formation of a visibly colored dye-developer complex to provide a visible color change from colorless to visibly colored.
Figure 1C:
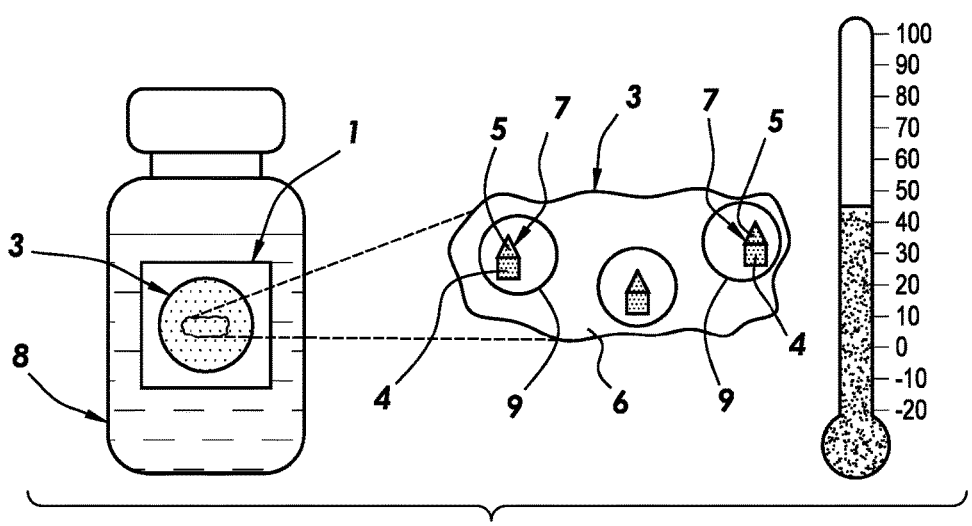
FIG. 1C shows an illustration of the particular embodiment of the temperature sensor shown in FIG. 1B following an increase in temperature from the temperature threshold, whereby the color-changing system retains the visible color change.

Now referring primarily to FIG. 1A through FIG. 1C, to elaborate on the above, as to particular embodiments, the color-changing system (3) can be formulated such that exposure to the temperature threshold (2) results in association of the dye (4) and the developer (5) to form a visibly colored dye-developer complex (7) which can be visually observed or detected, thereby indicating that the temperature sensor (1) has been exposed to the temperature threshold (2).

Now referring primarily to FIG. 2A through FIG. 2D, as to other particular embodiments, the color-changing system (3) can be formulated such that exposure to the temperature threshold (2) results in dissociation of the dye (4) and the developer (5) and accordingly, dissociation of the colored dye-developer complex (7), whereby the consequential color change to colorless can be visually observed or detected to indicate that the temperature sensor (1) has been exposed to the temperature threshold (2).

Accordingly, the method of use can include detecting whether or not a color change occurred, for example by visually observing the temperature sensor (1), whereby visual detection of a color change indicates that the temperature sensor (1) has been exposed to the temperature threshold (2). Conversely, visual detection of the absence of a color change, meaning no color change occurred, indicates that the temperature sensor (1) has not been exposed to the temperature threshold (2).

Regarding temperature-sensitive products (8), there is a need for an indicator that can (i) accompany the temperature-sensitive product (8), for example during shipping and storage, and (ii) indicate (preferably, via a direct visual indication) the thermal history of the temperature-sensitive product (8) and particularly, whether the temperature-sensitive product (8) has been exposed to a temperature threshold (2) which may compromise the quality and/or safety of the temperature-sensitive product (8).

Following, the method of use can include reliably associating the temperature sensor (1) with a temperature-sensitive product (8) and subsequently detecting whether or not a color change occurred. Consequently, visual detection of a color change indicates that the temperature-sensitive product (8) has been exposed to the temperature threshold (2), and visual detection of the absence of a color change indicates that the temperature-sensitive product (8) has not been exposed to the temperature threshold (2).

Of note, although the temperature sensor (1) may herein be shown in a highly simplified form for the sake of clarity and generality of presentation thereof, it should be appreciated that the temperature sensor (1) may have a more intricate structure and/or may form a portion of a more extensive marking or indicium, such as a barcode.

Definitions

As used herein, the term "sensor" means a composition or an apparatus which detects or measures a stimulus and reacts to it in a particular way.

As used herein, the term "detect" and forms thereof means to discover or ascertain the presence of.

As used herein, the term "preselected" means predetermined or decided in advance.

As used herein, the term "threshold" means the point which must be reached or exceeded for a certain phenomenon to occur or be manifested.

As used herein, the term "dye" means a chemical compound which can change color, such as a color former capable of reacting with the instant developer (5) to form a dye-developer complex (7) which exhibits optical properties that can be discerned by the human eye.

As used herein, the term "developer" means a chemical compound capable of reacting with the instant dye (4) to form a dye-developer complex (7) which exhibits optical properties that can be discerned by the human eye. The term "developer" can be synonymous with "color developer", both meaning a chemical compound which facilitates a change in color of the dye (4).

As used herein, the term "solvent" can, but need not necessarily, be synonymous with phase-change material, whereby phase-change material is herein defined as a material which changes from one phase to another.

As used herein, the term "temperature-sensitive product" means any product which may benefit from an indication of the thermal history thereof, for example because its quality may be adversely affected if its thermal history includes exposure to a particular temperature or range of temperatures. As but a few illustrative examples, temperature-sensitive products can include foodstuff, pharmaceuticals, chemical materials, biological materials, medical equipment, pigmented compositions (such as paint or stain), adhesives, etc.

As used herein, the term "foodstuff" means a good, item, or article that can be consumable (including edible or drinkable) or can be useful as an ingredient for making a consumable item or article. As but a few illustrative examples, foodstuffs can include fruits, juices, vegetables, grains, flours, milks, yogurts, sweetened beverages, meats, processed foods, medicaments, and the like.

Two objects, such as a temperature-sensitive product (8) and the temperature sensor (1), can be "reliably associated" if the association between the two objects can be expected not to be disrupted by routine treatment or processes. Non-limiting examples of such reliable association can include adhering one object to another, tying the two objects together, containing both objects in a container, printing one object (for example the temperature sensor (1) configured as a printing ink) on packaging material or a container used to contain the other object (for example the temperature-sensitive product (8)), affixing one object (for example the temperature sensor (1)) to packaging material or a container used to contain the other object (for example the temperature-sensitive product (8)), and laminating one object (for example the temperature sensor (1)) in a portion of a packaging material used to enclose the other object (for example the temperature-sensitive product (8)).

Temperature Sensor

Simply summarized again, and as shown in FIG. 1A through FIG. 2D, the instant temperature sensor (1), which may take the form of a composition or an apparatus, includes a color-changing system (3) comprising a dye (4), a developer (5), and a solvent (6). The developer (5) variably interacts with the dye (4) according to the temperature of the color-changing system (3), whereby upon exposure to a preselected temperature threshold (2), association or dissociation of the dye (4) and the developer (5) results in a color change which can be visually observed or detected.

As to particular embodiments, aspects of the instant temperature sensor (1) may be similar to the indicators disclosed in U.S. Pat. Nos. 10,113,920, 10,345,278, 10,585, 080, 10,605,681, and/or U.S. Patent Application No. 62/971,544, each of which is hereby incorporated by reference in its entirety herein.

Dye and Developer

The color-changing system (3) can be a reversible color-changing system, meaning that the color change can be reversible, as opposed to an irreversible color change or a permanent color change.

Following, as to particular embodiments, the dye (4) of the color-changing system (3) can comprise a leuco dye which can reversibly change between two forms, one of which can typically be colorless or substantially colorless.

As but a few illustrative examples, the leuco dye can be: crystal violet lactone (CAS No.: 1552-42-7); Pigment Blue 63 (CAS No.: 16521-38-3); 2'-(dibenzylamino)-6'-(diethylamino)fluoran (CAS No.: 34372-72-0); Yamamoto Black 15 or 2-(2,4-Dimethylphenylamino)-3-methyl-6-diethylaminofluoran (CAS No.: 36431-22-8); ODB or 7-Anilino-3-diethylamino-6-methyl fluoran (CAS No.: 29512-49-0); ODB-2 or 2-Anilino-6-dibutylamino-3-methylfluoran (CAS No.: 89331-94-2); 6'-(Diethylamino)-1',3'-dimethylfluoran orange (CAS No.: 21934-68-9); Yamamoto Red 40 or 3,3-bis(1-butyl-2-methyl-1H-indol-3-yl)phthalide (CAS No.: 50292-91-6); Yamamoto Red Blue 63 or 7-[4-(diethylamino)-2-ethoxyphenyl]-7-(1-ethyl-2-methyl-1H-indol-3-yl)furo[3,4-b]pyridin-5(7H)-one; or the like.

As to particular embodiments, the leuco dye can be an electron-donating compound (or proton-accepting compound). Further, the developer (5) can comprise an electron-accepting compound (or proton-donating compound), such as an acid and particularly, a weak acid. Upon interaction (specifically, an electron transfer reaction) between the electron-donating leuco dye and the electron-accepting developer, the leuco dye can reversibly change color, for example from a colorless state to a colored state. In this way, the color-changing system (3) can have two visual appearances which differ from one another depending upon temperature, namely (i) a first visual appearance which may be a colorless appearance, and (ii) a second visual appearance which may be a colored appearance.

As but a few illustrative examples, the developer (5) can be: 3,5-di-tert-butylcatechol (CAS No.: 1020-31-1); 4,4'-(1,3-dimethylbutylidene)diphenol (CAS No.: 1020-31-1); 2,2'-biphenol (CAS No.: 1806-29-7); 4-[2-ethyl-1-(4-hydroxyphenyl)hexyl]phenol (PubChem CID 13782487); or the like.

Without being bound by any particular theory of operation, it may be that within the reversible color-changing system (3), upon exposure to a temperature which results in association of the leuco dye and the developer (5), the developer (5) can reversibly interact with the leuco dye via an electron transfer reaction to open up the lactone ring of the leuco dye and stabilize the opened structure, forming a supramolecular colored dye-developer complex (7), to which a color change can be attributable. When open, the lactone ring can be cationic in nature, thereby extending conjugation of its π electrons and allowing absorption in the visible spectrum to provide the colored dye-developer complex (7), whereby the stability of the colored dye-developer complex (7) can be determined, at least in part, by the affinity of the developer (5) for the leuco dye.

Solvent

The color-changing system (3) further includes a solvent (6) which effects or controls the reversible interaction between the dye (4) and the developer (5).

As to particular embodiments, a solvent (6) which may be useful with the reversible color-changing system (3) can be (i) a solvent (6) in which both the dye (4) and the developer (5) are soluble, and (ii) a solvent (6) capable of being contained along with the dye (4) and the developer (5), for example within a capsule or microcapsule (9) to provide a corresponding encapsulated or microencapsulated color-changing system (3). When contained within the capsule or microcapsule (9), the solvent (6) can facilitate interaction between the dye (4) and the developer (5).

Without being bound by any particular theory of operation, it may be that within the reversible color-changing system (3), the developer (5) can also interact with the solvent (6) to form a solvent-developer complex, whereby this interaction can be determined, at least in part, by the affinity of the developer (5) for the solvent (6).

Following, it may be hypothesized that the color change can be linked to a competition between the dye (4) and the solvent (6) for complexing with the developer (5), whereby the developer (5) forms a complex with the molecule(s) which it has a greater affinity for.

It should be understood that once a complex forms, the complex can be stable until an amount of energy sufficient to destabilize the complex is input into the system, thereby dissociating the components of the complex.

Relating to the temperature sensor (1), at a higher temperature, the developer (5) can have a greater affinity for the solvent (6) than for the leuco dye and accordingly, the solvent-developer complex can be favored over the colored dye-developer complex (7). Thus, the developer (5) can be precluded from interacting with the leuco dye and correspondingly, the lactone ring can be closed and the leuco dye can be colorless.

Conversely, at a lower temperature, the developer (5) can have a greater affinity for the leuco dye than for the solvent (6); hence, the colored dye-developer complex (7) can form and stabilize.

As to particular embodiments, the solvent (6) can be an ester.

As to particular embodiments, the solvent (6) can be an ester as disclosed in U.S. Pat. Nos. 10,345,278, 10,585,080, 10,605,681, and/or U.S. Patent Application No. 62/971,544, each of which is hereby incorporated by reference in its entirety herein.

As to particular embodiments, the solvent (6) can be a diphenylmethyl ester.

As to particular embodiments, the ester can have Formula I as follows:

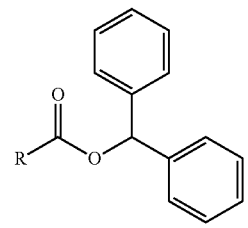

I wherein R can be (i) a straight-chain or branched alkyl group, (ii) a straight-chain or branched alkenyl group, or (iii) a straight-chain or branched alkynyl group, whereby any of the groups can be unsubstituted or substituted.

As to particular embodiments, R can have 5 or more carbon atoms, or can have at least 5 carbon atoms.

As to particular embodiments, R can have 7 or more carbon atoms, or can have at least 7 carbon atoms.

As to particular embodiments, R can have 9 or more carbon atoms, or can have at least 9 carbon atoms.

As to particular embodiments, R can have 11 or more carbon atoms, or can have at least 11 carbon atoms.

As to particular embodiments, R can have 13 or more carbon atoms, or can have at least 13 carbon atoms.

As to particular embodiments, R can have 15 or more carbon atoms, or can have at least 15 carbon atoms.

As to particular embodiments, R can have 17 or more carbon atoms, or can have at least 17 carbon atoms.

As to particular embodiments, R can have 19 or more carbon atoms, or can have at least 19 carbon atoms.

As to particular embodiments, the ester can have Formula II as follows:

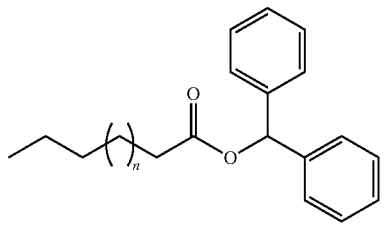

wherein n can be an integer between 1 and 15.

As to particular embodiments, the ester can have Formula III as follows:

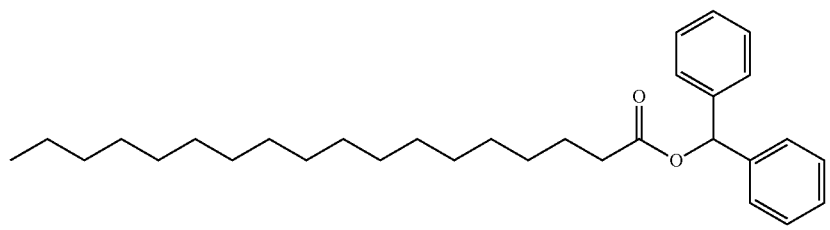

whereby this ester may have a molecular formula of $C_{31}H_{46}O_2$, a molecular weight of 450.70 g/mol, and a CAS Registry Number of 103390-75-6.

As to particular embodiments, the ester can have Formula IV as follows:

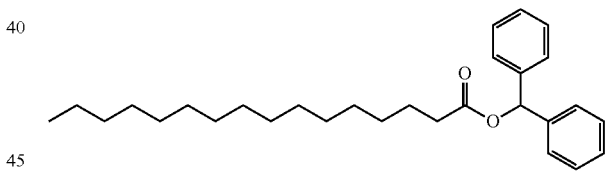

whereby this ester may have a molecular formula of $C_{29}H_{42}O_2$, a molecular weight of 422.64 g/mol, and a CAS Registry Number of 103209-25-2.

As to particular embodiments, the ester can have Formula V as follows:

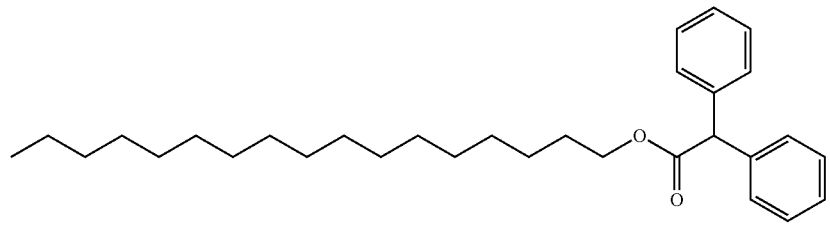

whereby this ester may have a molecular formula of $C_{31}H_{46}O_2$, and a molecular weight of 450.70 g/mol.

As to particular embodiments, the ester can have Formula VI as follows:

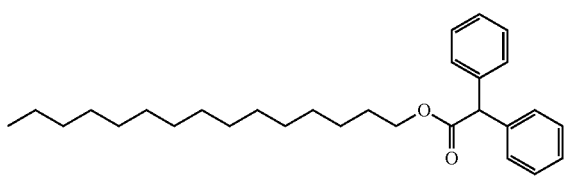

VI whereby this ester may have a molecular formula of $C_{29}H_{42}O_2$, and a molecular weight of 422.64 g/mol.

As to particular embodiments, the ester can have Formula VII as follows:

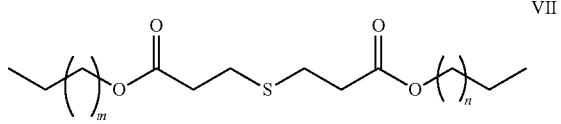

VII wherein m and n can each be an integer between 1 and 15.

As to particular embodiments, the ester can have Formula VIII as follows:

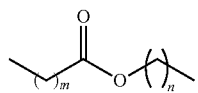

VIII wherein m and n can each be an integer between 2 and 15.

As to particular embodiments, the ester can have Formula IX as follows:

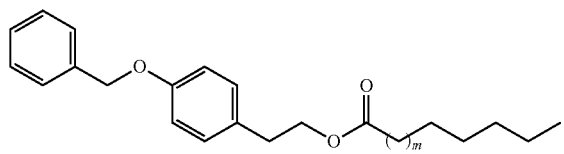

IX wherein m can be an integer between 1 and 10.

As to particular embodiments, the ester can have Formula X as follows:

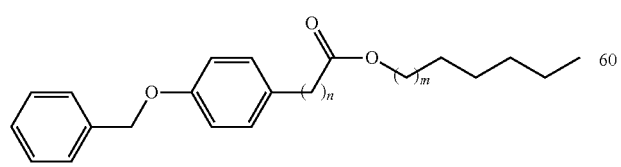

X wherein m can be an integer between 1 and 11, and n can be an integer between 1 and 3.

As to particular embodiments, the ester can have Formula XI as follows:

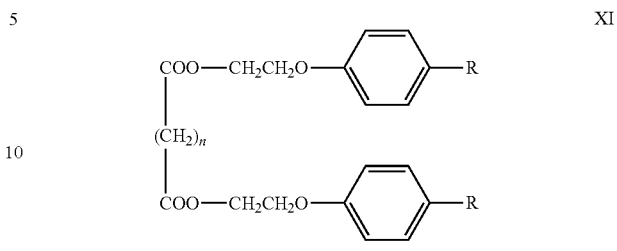

XI wherein R can be a hydrogen or an alkyl group from C1 to C4, and n can be an integer between 1 and 6.

As to particular embodiments, the ester can have Formula XII as follows:

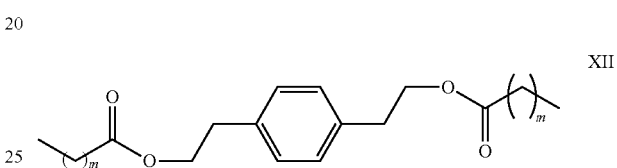

XII wherein m can be an integer between 1 and 10.

As to particular embodiments, the ester can have Formula XIII as follows:

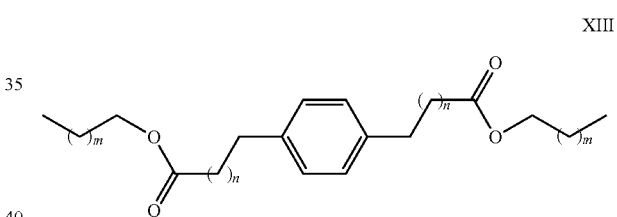

XIII wherein m can be an integer between 1 and 10, and n can be an integer between 0 and 2.

As to particular embodiments, the solvent (6) can be a hydrocarbon.

As to particular embodiments, the solvent (6) can be a ketone.

As to particular embodiments, the solvent (6) can be a ketone as disclosed in U.S. Pat. Nos. 10,345,278, 10,585,080, 10,605,681, and/or U.S. Patent Application No. 62/971,544, each of which is hereby incorporated by reference in its entirety herein.

As to particular embodiments, the ketone can have Formula XIV as follows:

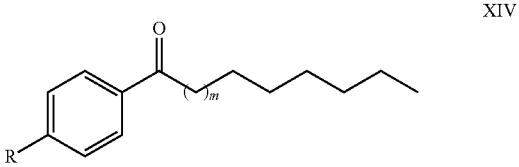

XIV wherein R can be a hydrogen or an alkyl group, such as methyl group or an ethyl group; and wherein n can be an integer between 1 and 10.

As to particular embodiments, the solvent (6) can be an alcohol.

As to particular embodiments, the solvent (6) can be an alcohol as disclosed in U.S. Pat. Nos. 10,345,278, 10,585,080, 10,605,681, and/or U.S. Patent Application No. 62/971,544, each of which is hereby incorporated by reference in its entirety herein.

As to particular embodiments, the solvent (6) can be a single compound.

As to particular embodiments, the solvent (6) can be in an amount of about 50% to about 99% of the color-changing system (3).

As to particular embodiments, the solvent (6) can be in an amount of about 60% to about 75% of the color-changing system (3).

As to other particular embodiments, the solvent (6) can be a mixture of two or more compounds. As to particular embodiments, the solvent (6) can be a mixture of two or more of the solvents (6) described above.

As to particular embodiments, the solvent (6) comprising a mixture of two or more compounds can be in an amount of about 50% to about 99% of the color-changing system (3).

As to particular embodiments, the solvent (6) comprising a mixture of two or more compounds can be in an amount of about 60% to about 75% of the color-changing system (3).

As to particular embodiments, the solvent (6) can be a mixture of the esters shown in Formulas III and IV, whereby the ester shown in Formula III and the ester shown in Formula IV can be in a ratio of 1:1. Of course, as to other particular embodiments, other ratios may be used and are herein contemplated.

Phase Change Material

As to particular embodiments, the solvent (6) can be a phase change material which changes between a liquid phase (or a substantially liquid phase) and a solid phase (or a substantially solid phase) according to the temperature of the color-changing system (3).

As to particular embodiments, the solvent (6) can change from a liquid phase to a solid phase upon exposure to the temperature threshold (2).

As to other particular embodiments, the solvent (6) can change from a solid phase to a liquid phase upon exposure to the temperature threshold (2).

As to particular embodiments, the solid phase of the solvent (6) can facilitate or enable interaction between the leuco dye and the developer (5), whereby the colored dye-developer complex (7) can be a crystalized structure having an extended conjugation of its $\pi$ electrons.

In contrast, the liquid phase of the solvent (6) can preclude interaction between the leuco dye and the developer (5), rendering the leuco dye colorless.

Color Memory

As described above, the color-changing system (3) can be a thermochromic color-changing system which can be susceptible to a temperature-modulated color change. Additionally, the color-changing system (3) can be a reversible thermochromic color-changing system, whereby the temperature-modulated color change can be reversible, as opposed to an irreversible color change or a permanent color change.

Further, the color-changing system (3) can have a color-memory property whereby after a color change occurs following exposure to the temperature threshold (2), the color change can be retained even upon discontinuation of exposure to the temperature threshold (2); hence, the color change can be retained at temperatures which differ from the temperature threshold (2). Correspondingly, the temperature sensor (1) can effectively record exposure to the temperature threshold (2), thereby functioning as a cumulative exposure indicator, which can be in contrast to a conventional thermometer that only displays the current temperature and does not record temperatures which the thermometer may have been exposed to prior to exposure to the current temperature.

Concerning color-changing characteristics, the color-changing system (3) can include a coloration temperature at which the color-changing system (3) reversibly changes from a colorless state to a colored state. Also, the color-changing system (3) can include a decoloration temperature at which the color-changing system (3) reversibly changes from the colored state to the colorless state.

Significantly, the coloration and decoloration temperatures of the color-changing system (3) can be different, meaning that the coloration temperature can be discrete from the decoloration temperature. For example, the coloration temperature can be less than the decoloration temperature.

Consequently, the color-memory property of the color-changing system (3) can facilitate retention of the color change upon an increase in temperature from the coloration temperature. Accordingly, the color-memory property of the color-changing system (3) can facilitate retention of the colored state upon an increase in temperature from the coloration temperature, as shown in FIG. 1B and FIG. 1C.

Moreover, the color-memory property of the color-changing system (3) can facilitate retention of the color change upon a decrease in temperature from the decoloration temperature. Accordingly, the color-memory property of the color-changing system (3) can facilitate retention of the colorless state upon a decrease in temperature from the decoloration temperature, as shown in FIG. 2C and FIG. 2D.

As to particular embodiments, the coloration temperature can be associated with the freezing point of the color-changing system (3) and the decoloration temperature can be associated with the melting point of the color-changing system (3). Accordingly, the color-changing system (3) can include (i) a freezing point at which the color-changing system (3) changes from a colorless state to a colored state, and (ii) a melting point at which the color-changing system (3) changes from a colored state to a colorless state.

Of note, because of the color-memory property of the color-changing system (3), as to particular embodiments, after exposure to a temperature threshold (2) resulting in association of the dye (4) and the developer (5), the colored dye-developer complex (7) can remain stable even when the solvent (6) may be in the liquid phase (for example, upon an increase in temperature).

Likewise and again because of the color-memory property of the color-changing system (3), as to particular embodiments, after exposure to a temperature threshold resulting in dissociation of the dye (4) and the developer (5), the dye (4) and the developer (5) can remain dissociated even when the solvent (6) may be in the solid phase (for example, upon a decrease in temperature).

As to particular embodiments, the coloration temperature can differ from the decoloration temperature by at least one selected from the group including or consisting of: at least about 20 Celsius degrees, at least about 25 Celsius degrees, at least about 30 Celsius degrees, at least about 35 Celsius degrees, at least about 40 Celsius degrees, at least about 45 Celsius degrees, at least about 50 Celsius degrees, at least about 55 Celsius degrees, at least about 60 Celsius degrees, at least about 65 Celsius degrees, at least about 70 Celsius degrees, at least about 75 Celsius degrees, at least about 80 Celsius degrees, at least about 85 Celsius degrees, at least about 90 Celsius degrees, at least about 95 Celsius degrees, at least about 100 Celsius degrees, and greater than about 100 Celsius degrees.

As to particular embodiments, the coloration temperature can differ from the decoloration temperature by at least about 20 Celsius degrees, meaning that the decoloration temperature can be at least about 20 Celsius degrees greater than the coloration temperature.

As to particular embodiments, the coloration temperature can differ from the decoloration temperature by at least about 25 Celsius degrees, meaning that the decoloration temperature can be at least about 25 Celsius degrees greater than the coloration temperature.

As to particular embodiments, the coloration temperature can differ from the decoloration temperature by at least about 30 Celsius degrees, meaning that the decoloration temperature can be at least about 30 Celsius degrees greater than the coloration temperature.

As to particular embodiments, the coloration temperature can differ from the decoloration temperature by at least about 35 Celsius degrees, meaning that the decoloration temperature can be at least about 35 Celsius degrees greater than the coloration temperature.

As to particular embodiments, the coloration temperature can differ from the decoloration temperature by at least about 40 Celsius degrees, meaning that the decoloration temperature can be at least about 40 Celsius degrees greater than the coloration temperature, whereby as to particular embodiments, at least about 40 Celsius degrees may be the preferable minimal difference.

As to particular embodiments, the coloration temperature can differ from the decoloration temperature by at least about 45 Celsius degrees, meaning that the decoloration temperature can be at least about 45 Celsius degrees greater than the coloration temperature, whereby as to particular embodiments, at least about 45 Celsius degrees may be the preferable minimal difference.

As to particular embodiments, the coloration temperature can differ from the decoloration temperature by at least about 50 Celsius degrees, meaning that the decoloration temperature can be at least about 50 Celsius degrees greater than the coloration temperature, whereby as to particular embodiments, at least about 50 Celsius degrees may be the preferable minimal difference.

As to particular embodiments, the coloration temperature can differ from the decoloration temperature by at least about 55 Celsius degrees, meaning that the decoloration temperature can be at least about 55 Celsius degrees greater than the coloration temperature, whereby as to particular embodiments, at least about 55 Celsius degrees may be the preferable minimal difference.

As to particular embodiments, the coloration temperature can differ from the decoloration temperature by at least about 60 Celsius degrees, meaning that the decoloration temperature can be at least about 60 Celsius degrees greater than the coloration temperature.

As to particular embodiments, the coloration temperature can differ from the decoloration temperature by at least about 65 Celsius degrees, meaning that the decoloration temperature can be at least about 65 Celsius degrees greater than the coloration temperature.

As to particular embodiments, the coloration temperature can differ from the decoloration temperature by at least about 70 Celsius degrees, meaning that the decoloration temperature can be at least about 70 Celsius degrees greater than the coloration temperature.

As to particular embodiments, the coloration temperature can differ from the decoloration temperature by at least about 75 Celsius degrees, meaning that the decoloration temperature can be at least about 75 Celsius degrees greater than the coloration temperature.

As to particular embodiments, the coloration temperature can differ from the decoloration temperature by at least about 80 Celsius degrees, meaning that the decoloration temperature can be at least about 80 Celsius degrees greater than the coloration temperature.

As to particular embodiments, the coloration temperature can differ from the decoloration temperature by at least about 85 Celsius degrees, meaning that the decoloration temperature can be at least about 85 Celsius degrees greater than the coloration temperature.

As to particular embodiments, the coloration temperature can differ from the decoloration temperature by at least about 90 Celsius degrees, meaning that the decoloration temperature can be at least about 90 Celsius degrees greater than the coloration temperature.

As to particular embodiments, the coloration temperature can differ from the decoloration temperature by at least about 95 Celsius degrees, meaning that the decoloration temperature can be at least about 95 Celsius degrees greater than the coloration temperature.

As to particular embodiments, the coloration temperature can differ from the decoloration temperature by at least about 100 Celsius degrees, meaning that the decoloration temperature can be at least about 100 Celsius degrees greater than the coloration temperature.

As to particular embodiments, the coloration temperature can differ from the decoloration temperature by greater than about 100 Celsius degrees.

Now referring primarily to FIG. 3, hysteresis characteristics of a particular embodiment of the reversible color-changing system (3) having a color-memory property can be described by illustrating the dependence of color density on temperature.

Now more specifically, the y axis shows the color density and the x axis shows the temperature. The color density of the color-changing system (3) changes with temperature along the curve in the direction shown by the arrow marks. Point A indicates the color density at the highest temperature $T_1$ for achieving the completely colored state (whereby $T_1$ can be the complete coloration temperature). Point B indicates the color density at the highest temperature $T_2$ for retention of the completely colored state (whereby $T_2$ can be the decoloration initiation temperature). Point C indicates the color density at the lowest temperature $T_3$ for achieving a completely colorless state (whereby $T_3$ can be the complete decoloration temperature). Point D indicates the color density at the lowest temperature $T_4$ for retention of the completely colorless state (whereby $T_4$ can be the coloration initiation temperature).

While both the completely colored state and the completely colorless state can exist between $T_4$ and $T_2$, the state retained can be dependent upon the state previously achieved. For example, if the completely colored state was previously achieved upon exposure to $T_1$, the completely colored state will be retained until exposure to a temperature equal to or greater than $T_2$. Alternatively, if the completely colorless state was previously achieved upon exposure to $T_3$, the completely colorless state will be retained until exposure to a temperature equal to or lesser than $T_4$.

Said another way, the color-changing system (3) may be in the completely colored state or the completely colorless state at a temperature between $T_2$ and $T_4$, depending upon whether the color-changing system (3) approaches that temperature from a lower or higher temperature or depending upon whether the color-changing system (3) is being heated from a lower temperature or cooled from a higher temperature.

As to particular embodiments, the colored state or the colorless state can be retained upon exposure to temperatures between about 20 Celsius degrees to about 100 Celsius degrees or between about 50 Celsius degrees to about 100 Celsius degrees from the temperature at which the colored state or the colorless state was achieved. In other words, the length of segment EF shown in FIG. 3, which represents the temperature range width indicating the degree of hysteresis or hysteresis range or hysteresis window ΔH, can be in a range of between about 20 Celsius degrees to about 100 Celsius degrees or between about 50 Celsius degrees to about 100 Celsius degrees.

Transition Temperature

As to particular embodiments, in addition to having a color-memory property, the color changing system (3) can also have a narrow transition between the colorless state and the colored state, or between the colored state and the colorless state.

Again referring primarily to FIG. 3, a narrow transition between the colorless state and the colored state means that the difference between the coloration initiation temperature ($T_4$) and the complete coloration temperature ($T_1$) is relatively small, whereby this difference may be referred to as $\Delta_{T4-T1}$.

Notably, $\Delta_{T4-T1}$ can be related to the sensitivity of the temperature sensor (1), whereby a smaller difference between the coloration initiation temperature ($T_4$) and the complete coloration temperature ($T_1$) can equate to greater sensitivity, whereby it may be advantageous to have a more sensitive, and accordingly more accurate, temperature sensor (1).

Likewise, again referring primarily to FIG. 3, a narrow transition between the colored state and the colorless state means that the difference between the decoloration initiation temperature ($T_2$) and the complete decoloration temperature ($T_3$) is relatively small, whereby this difference may be referred to as $\Delta_{T3-T2}$.

As with $\Delta_{T4-T1}$, $\Delta_{T3-T2}$ can be related to the sensitivity of the temperature sensor (1), whereby a smaller difference between the decoloration initiation temperature ($T_2$) and the complete decoloration temperature ($T_3$) can equate to greater sensitivity, whereby it may be advantageous to have a more sensitive, and accordingly more accurate, temperature sensor (1).

As to particular embodiments, the difference between the coloration initiation temperature and the complete coloration temperature ($\Delta_{T4-T1}$) and/or the difference between the decoloration initiation temperature and the complete decoloration temperature ($\Delta_{T3-T2}$) can be not greater than about 4 Celsius degrees.

As to particular embodiments, the difference between the coloration initiation temperature and the complete coloration temperature ($\Delta_{T4-T1}$) and/or the difference between the decoloration initiation temperature and the complete decoloration temperature ($\Delta_{T3-T2}$) can be not greater than about 3 Celsius degrees.

As to particular embodiments, the difference between the coloration initiation temperature and the complete coloration temperature ($\Delta_{T4-T1}$) and/or the difference between the decoloration initiation temperature and the complete decoloration temperature ($\Delta_{T3-T2}$) can be not greater than about 2 Celsius degrees.

As to particular embodiments, the difference between the coloration initiation temperature and the complete coloration temperature ($\Delta_{T4-T1}$) and/or the difference between the decoloration initiation temperature and the complete decoloration temperature ($\Delta_{T3-T2}$) can be not greater than about 1 Celsius degree.

As to particular embodiments, $T_4=T_1$ and/or $T_3=T_2$.

Microcapsules

As to particular embodiments, the reversible color-changing system (3) can be contained, meaning that the dye (4), the developer (5), and the solvent (6) are continuously kept within a physical proximity which allows interaction between the components. Additionally, by being contained, the color-changing system (3) can be separated from the external environment, which may damage or destroy the color-changing system (3).

As stated above, as to particular embodiments, the color-changing system (3) can be encapsulated within a capsule or microcapsule (9) to provide a corresponding encapsulated or microencapsulated color-changing system (3), whereby the capsule or microcapsule (9) can have a diameter in a range of between about 500 nanometers to about 50 microns, depending upon the embodiment. As to particular embodiments, the microcapsules (9) can have a mean diameter of between about 1 micron to about 3 microns.

The capsule or microcapsule wall which forms the corresponding capsule or microcapsule (9) around the color-changing system (3) can be formed from any of a numerous and wide variety of polymers, such as melamine formaldehyde resin (CAS No.: 9003-08-01); polyurethane resin (CAS No.: 9009-54-5); acrylic resin, epoxy resin, CYMEL® 385 resin, gelatin, or the like.

Coating

As to particular embodiments of the temperature sensor (1), the encapsulated or microencapsulated color-changing system (3) can be incorporated into a coating. As but one illustrative example, the encapsulated or microencapsulated color-changing system (3) can be incorporated into an ink.

As to particular embodiments, the ink can be selected from the group including or consisting of: flexographic inks, gravure inks, offset inks, screen inks, and metal decoration inks. The ink can be water-based, solvent-based, UV-curable, wet, dry, or combinations thereof, depending upon the application.

As but only a few illustrative examples, the ink can comprise: an acrylic solution, an acrylic emulsion, a sulfonated polyester, a polyester resin, an epoxy resin, an acrylated monomer or oligomer, an alkyd resin, or the like.

As to particular embodiments, the ink can be specifically formulated for application to a substrate via printing, such as medium-speed printing or high-speed printing onto a substrate configured as a label, tag, or packaging material.

Substrate

As to particular embodiments of the temperature sensor (1), the encapsulated or microencapsulated color-changing system (3) can be coupled to a substrate, which can be formed from any of a numerous and wide variety of materials. As but a few illustrative examples, the substrate can include paper, paper products, wood, fiber, metal, glass, ceramic, plastic, thermoplastic materials, thermoset materials, or the like, or combinations thereof.

Additionally, as to particular embodiments, the temperature sensor (1) can, but need not necessarily, further include a cover which covers the encapsulated or microencapsulated color-changing system (3) coupled to the substrate, thus disposing the encapsulated or microencapsulated color-changing system (3) between the substrate and the cover.

The cover may be used for aesthetic reasons or for safety reasons, for example when it may be desirable to prevent contact between elements of the temperature sensor (1) and the temperature-sensitive product (8).

The precise shapes and conformations of the substrate and the cover may not be critical. However, some embodiments lend themselves to easier manufacture and assembly. For example, in one embodiment, the substrate and the cover can have the form of a sheet (i.e., the substrate and the cover are configured as two sheets opposed adjacent one another). The substrate and the cover can have approximately the same thickness or different thicknesses, such as each being a plastic film having a thickness of about 2 to 50 mils.

The materials from which each of the substrate and the cover are made can be substantially immaterial, other than the substrate should be sufficient to support the encapsulated or microencapsulated color-changing system (3) and the cover should be sufficient to cover the encapsulated or microencapsulated color-changing system (3). By way of example, each of the substrate and the cover can be a polyester film having a thickness of about 2 to 10 mils. Preferably, at least one of the substrate and the cover can be transparent.

At least one of the substrate and the cover can have a viewing portion adapted to permit detection of the color change associated with formation of the colored dye-developer complex (7), for example by visual observation of the temperature sensor (1) (i.e., not requiring disassembly of the temperature sensor (1)). Alternatively, the temperature sensor (1) can be disassembled to determine whether the colored dye-developer complex (7) formed. As to particular embodiments, at least one of the substrate and the cover can be sufficiently transparent or translucent such that the color change can be detected by direct visual observation of the viewing portion.

As to particular embodiments, one or both of the substrate and the cover can act as a packaging material or package, or a component thereof, for containing a temperature-sensitive product (8). The substrate, the cover, or both can be an integral part of the packaging material (i.e., unitary with the packaging material such that removal of the substrate or the cover would compromise the integrity of the packaging material and its function of separating its interior from the external environment). Alternatively, the substrate, the cover, or both can be separable (e.g., tearable, detachable, or peelable) from the packaging material.

As to particular embodiments, the capsules or microcapsules (9) which contain the color-changing system (3) can be bound to the substrate, to the cover, or to both, either directly or by way of a binding agent.

Alternatively, as to other particular embodiments, the capsules or microcapsules (9) which contain the color-changing system (3) can be kept proximate to, but not necessarily bound to any surface of, the substrate or the cover.

Container Component as Substrate

As to particular embodiments, the encapsulated or microencapsulated color-changing system (3) can be coupled to a substrate configured as a container component of a container which can contain the temperature-sensitive product (8).

As to particular embodiments, the container component can include or be formed from at least one thermoplastic material, such as a thermoplastic polymer, or a thermoplastic resin. Following, the container component can include at least one thermoplastic material and the encapsulated or microencapsulated color-changing system (3).

As to particular embodiments, the container component can include or be formed from at least one thermoset material, such as a thermosetting polymer, a thermosetting resin, or a thermosetting plastic. Following, the container component can include at least one thermoset material and the encapsulated or microencapsulated color-changing system (3).

As to particular embodiments, the thermoplastic material and/or the thermoset material can include a material that can be processed below about 232° C. (about 450° F.). As but a few illustrative examples, the thermoplastic material and/or the thermoset material can include low density polyethylene (LDPE), linear low density polyethylene (LLDPE), high density polyethylene (HDPE), polypropylene (PP, OPP, BOPP), polystyrene (PS), high impact polystyrene (HIPS), styrene acrylonitrile (SAN), acrylonitrile butadiene styrene (ABS), polycarbonate (PC), polyurethane (PU), silicones (PDMS), polyvinyl chloride (PVC), polyethylene terephthalate (PET), crystalline polystyrene, epoxy, epoxy resins, and polyepoxides, of the like, or combinations thereof.

As to particular embodiments, the container component can include or be formed from the encapsulated or microencapsulated color-changing system (3) in admixture with at least a portion of the thermoplastic material.

As to particular embodiments, the container component can include or be formed from the encapsulated or microencapsulated color-changing system (3) incorporated into at least a portion of the thermoplastic material.

As to particular embodiments, the container component can include or be formed from the encapsulated or microencapsulated color-changing system (3) integrated with at least a portion of the thermoplastic material.

As to particular embodiments, the container component can include or be formed from the encapsulated or microencapsulated color-changing system (3) suspended in at least a portion of the thermoplastic material.

As to particular embodiments, the container component can include or be formed from the encapsulated or microencapsulated color-changing system (3) substantially homogenously suspended in at least a portion of the thermoplastic material.

As to particular embodiments, the container component can include or be formed from the encapsulated or microencapsulated color-changing system (3) embedded in at least a portion of the thermoplastic material.

As to particular embodiments, the container component can include or be formed from the encapsulated or microencapsulated color-changing system (3) substantially homogenously embedded in at least a portion of the thermoplastic material.

In contrast to the above, as to particular embodiments, the encapsulated or microencapsulated color-changing system (3) can be applied to an external surface of the container component.

As to particular embodiments, the encapsulated or microencapsulated color-changing system (3) can be printed on an external surface of the container component.

As to particular embodiments, the encapsulated or microencapsulated color-changing system (3) can be incorporated into an ink which can be printed on an external surface of the container component.

As to particular embodiments, the container component can be configured as a closure, such as a cap or a lid.

Regarding production, the thermoplastic material can be formed into an embodiment of a container component according to known methods for producing plastic products, including (but not limited to) injection molding, compression molding, and extrusion.

Additionally, concerning production of a container component including an admixture of the encapsulated or microencapsulated color-changing system (3) and the thermoplastic material, the encapsulated or microencapsulated color-changing system (3) can be incorporated into the container component according to known methods for producing plastic products including two or more constituents. As to particular embodiments, the encapsulated or microencapsulated color-changing system (3) can be incorporated as a masterbatch or mixed or admixed or integrated with the thermoplastic material prior to formation of the container component.

The amount of the encapsulated or microencapsulated color-changing system (3) incorporated into the container component may not be particularly limited, so long as the desired thermochromic effect can be achieved. As to particular embodiments, the encapsulated or microencapsulated color-changing system (3) can be present in the container component in an amount of about 1% to about 50% by weight, based on the weight of the container component.

Low Temperature Indicator

As to particular embodiments, the instant temperature sensor (1) can be used as a low temperature indicator, a cool temperature indictor, or a freeze indicator, whereby the preselected temperature threshold (2) can be a temperature at which a temperature-sensitive product (8) becomes undesirably cool or freezes.

Following, if the temperature-sensitive product (8) and reliably-associated temperature sensor (1) are exposed to the temperature threshold (2), the colored dye-developer complex (7) will form and remain stable even upon an increase in temperature to effectively record exposure of the temperature-sensitive product (8) to the temperature threshold (2).

Now referring primarily to FIG. 1A through FIG. 1C, and FIG. 3, one illustrative example of a low temperature indicator is illustrated, whereby upon exposure to the temperature threshold (2), the color-changing system (3) can undergo a color change and be completely colored at $T_1$. Following, the completely colored state can be retained upon an increase in temperature, as the colored dye-developer complex (7) remains stable until temperature $T_2$ is reached.

As to particular embodiments, the temperature threshold (2) may, but need not necessarily, be a temperature not higher than about 2° Celsius, and $T_2$ may, but need not necessarily, be a temperature not lower than ambient, and not lower than about 45° Celsius.

As to particular embodiments, the temperature threshold (2) may, but need not necessarily, be a temperature of about 2° Celsius, and $T_2$ may, but need not necessarily, be a temperature of about 45° Celsius. Notably, this example has a hysteresis window ($\Delta$H) of 43 Celsius degrees.

As to particular embodiments, the temperature threshold (2) may be a temperature between about −20° Celsius and about 20° Celsius.

As to particular embodiments, the esters shown in Formulas I through VI may be useful for embodiments of the temperature sensor (1) configured as a low temperature indicator, a cool temperature indictor, or a freeze indicator.

High Temperature Indicator

As to particular embodiments, the instant temperature sensor (1) can be used as a high temperature indicator, a warm temperature indictor, or a thaw indicator, whereby the preselected temperature threshold (2) can be a temperature at which a temperature-sensitive product (8) becomes undesirably warm or thaws.

Following, if the temperature-sensitive product (8) and reliably-associated temperature sensor (1) are exposed to the temperature threshold (2), the dye (4) and developer (5) will dissociate and remain dissociated even upon a decrease in temperature to effectively record exposure of the temperature-sensitive product (8) to the temperature threshold (2).

Now referring primarily to FIG. 2A, as to particular embodiments of the temperature sensor (1) which function as a high temperature indicator, activation of the color-changing system (3) may be required prior to use. For example, the color-changing system (3) may be activated by exposure to an activation temperature (10) which results in association of the dye (4) and the developer (5) to form the colored dye-developer complex (7). Following, upon exposure to a temperature threshold (2) which results in dissociation of the dye (4) and the developer (5) and accordingly, dissociation of the colored dye-developer complex (7), a color change to colorless can occur.

As to particular embodiments, the activation temperature (10) can be significantly lower than the lowest temperature typically achievable by a conventional refrigerator. Thus, after recordation of a color change from colored to colorless, exposure to a conventional refrigerator will not induce formation of the colored dye-developer complex (7).

As to particular embodiments, the activation temperature (10) can be significantly lower than the lowest temperature typically achievable by a conventional freezer. Thus, after recordation of a color change from colored to colorless, exposure to a conventional freezer will not induce formation of the colored dye-developer complex (7).

As to particular embodiments, the activation temperature (10) can be a temperature achievable with freeze spray, cold spray, vapocoolant, refrigerant spray, gas duster, or the like, which may be able to achieve a temperature of lower than about −20° Celsius, for example a temperature of about −50° Celsius.

Now referring primarily to FIG. 2B through FIG. 2D, and FIG. 3, one illustrative example of a high temperature indicator is illustrated, whereby upon exposure to the temperature threshold (2), the color-changing system (3) can undergo a color change and be completely colorless at $T_3$ (as shown in FIG. 2C). Following, the completely colorless state can be retained upon a decrease in temperature from $T_3$ (as shown in FIG. 2D), as the dye (4) and developer (5) remain dissociated until temperature $T_4$ is reached.

As to particular embodiments, the temperature threshold (2) may, but need not necessarily, be a temperature not lower than about 8° Celsius, and $T_4$ may, but need not necessarily, be a temperature not higher than about −1° Celsius.

As to particular embodiments, the temperature threshold (2) may, but need not necessarily, be a temperature of about 8° Celsius, and $T_4$ may, but need not necessarily, be a temperature of about −1° Celsius. Notably, this example has a hysteresis window ($\Delta$H) of 9 Celsius degrees.

As to particular embodiments, the temperature threshold (2) may, but need not necessarily, be a temperature not lower than about 8° Celsius, and $T_4$ may, but need not necessarily, be a temperature not higher than about −5° Celsius.

As to particular embodiments, the temperature threshold (2) may, but need not necessarily, be a temperature of about 8° Celsius, and $T_4$ may, but need not necessarily, be a temperature of about −5° Celsius. Notably, this example has a hysteresis window ($\Delta$H) of 13 Celsius degrees.

As to particular embodiments, the temperature threshold (2) may be a temperature between about −20° Celsius and about 20° Celsius.

As to particular embodiments, the esters shown in Formulas VII through IX may be useful for embodiments of the temperature sensor (1) configured as a high temperature indicator, a warm temperature indictor, or a thaw indicator.

Dual Temperature Indicator

As to particular embodiments, the instant temperature sensor (1) can include a plurality of populations of encapsulated or microencapsulated color-changing systems (3), whereby each population has a characteristic preselected temperature threshold (2) to which it reacts to provide a color change.

For example, the temperature sensor (1) can include (i) a first color-changing system (11) useful as a low temperature indicator (thus, having a relatively low temperature threshold (2)) and (ii) a second color-changing system (12) useful as a high temperature indicator (thus, having a relatively high temperature threshold (2)), whereby the components of the color-changing systems (11)(12) can be the same or different, depending upon the application. This dual temperature indicator may be employed to provide an indication of exposure to at least two temperature thresholds (2), which may be useful to determine if a temperature-sensitive product (8) was maintained within a preselected temperature range between the two temperature thresholds (2).

Prior to use, the second color-changing system (12) can be activated (as described above and as shown in FIG. 4A) and accordingly, can be in a colored state. Subsequently, the temperature sensor (1) can initially display both a colored state (via the activated second color-changing system (12)) and a colorless state (via the first color-changing system (11)) when at a temperature above $T_4$ and below $T_2$.

In use, if the temperature sensor (1) is exposed to a temperature at or below the temperature threshold (2) of the first color-changing system (11), namely below $T_1$, both the first and second color-changing systems (11)(12) will be in a completely colored state, as shown in FIG. 4B. Further, if the temperature sensor (1) is exposed to a temperature at or above the temperature threshold (2) of the second color-changing system (12), namely above $T_3$, both the first and second color-changing systems (11)(12) will be in a completely colorless state, as shown in FIG. 4C. After exposure to at least one of the temperature thresholds (2), it will not be possible for the temperature sensor (1) to display both a completely colored state and a completely colorless state, thereby providing evidence of exposure to at least one of the temperature thresholds (2).

As but one illustrative example, a particular embodiment of the dual temperature indicator can indicate exposure to temperatures outside a range of about 2° Celsius to about 8° Celsius. Said another way, this embodiment of the dual temperature indicator can function as (i) a low temperature indicator with a temperature threshold (2) of about 2° Celsius and (ii) a high temperature indicator with a temperature threshold (2) of about 8° Celsius.

It is herein contemplated that embodiments of the instant dual temperature indicator may be useful as tamper indicators, especially if the first and second color-changing systems (11)(12) are disposed on a substrate such that they cannot be thermally separated. As but one illustrative example, this may be accomplished by arranging the first and second color-changing systems (11)(12) adjacent one another or interposed between one another.

Regarding tampering, embodiments of the dual temperature indicator may be particularly useful with sealed items which may be subjected to unauthorized opening and resealing, whereby this tampering may not have been previously detectable.

For example, one method of unauthorized opening of a sealed item may involve heating the sealing adhesive to a temperature at which it ceases to act as an adherent, thereby allowing access to the previously-sealed item; following, the item may then be resealed. Alternatively, another method of unauthorized opening may involve freezing the sealing adhesive to a temperature at which it ceases to act as an adherent, thereby again allowing access to the previously-sealed item; heating the adhesive may then allow it to regain its adhesive properties such that the unauthorized access may not detectable. In these instances, the instant dual temperature indicator would provide a visual indication of both the heating and cooling of the sealing adhesive, thus providing visual evidence of tampering.

Additional Indicators

As to particular embodiments, the instant temperature sensor (1) can include other indicators (e.g., a time indicator, a pressure indicator, a moisture indicator, etc.) associated with it, so that the temperature-sensing functionality of the temperature sensor (1) can be combined with corresponding time-sensing functionality, pressure-sensing functionality, moisture-sensing functionality, etc.

Barcode

As to particular embodiments, the instant temperature sensor (1) can be configured as a human-readable textual message or a machine-readable message. Regarding the latter, as to particular embodiments, the temperature sensor (1) can be configured as a barcode or a matrix barcode, which can typically be read by a scanner.

As to particular embodiments, the barcode can be colored and machine-readable at temperatures less than the temperature threshold (2), and colorless at temperatures greater than the temperature threshold (2), thus rendering the barcode unreadable.

Example 1

The subject matter of this disclosure is now described with reference to the following example. Of note, this example is provided for the purpose of illustration only, and the subject matter is not limited to this example, but rather encompasses all variations which are evident as a result of the teachings provided herein.

A particular embodiment of a microencapsulated reversible thermochromic color-changing system can be made, according to methods taught in U.S. Pat. Nos. 8,883,049, 9,175,175, and 9,695,320, by combining (i) about 5-15% w/w crystal violet lactone as the dye, (ii) about 5-15% w/w 4-[2-ethyl-1-(4-hydroxyphenyl)hexyl]phenol as the developer, (iii) about 55-65% w/w of a mixture of the solvents shown in Formulas III and IV present in a 1:1 ratio, and (iv) about 15-25% w/w melamine resin, whereby the latter forms the microcapsule wall upon microencapsulation of the dye, developer, and solvent. As to particular embodiments, this microencapsulated reversible thermochromic color-changing system can exhibit a coloration initiation temperature at about 0° Celsius and a complete coloration temperature at about −2° Celsius, thus having a narrow transition between the colorless state and the colored state and namely, a difference of only about 2 Celsius degrees between the coloration initiation temperature and the complete coloration temperature. Additionally, this microencapsulated reversible thermochromic color-changing system can change from colored to colorless at about 50° Celsius.

Following, the microencapsulated reversible thermochromic color-changing system can be incorporated into an ink vehicle, for example in an amount of about 35-45% w/w.

As can be easily understood from the foregoing, the basic concepts of the present invention may be embodied in a variety of ways. The invention involves numerous and varied embodiments of a temperature sensor and methods for making and using such a temperature sensor.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "combination" should be understood to encompass disclosure of the act of "sensing"—whether explicitly discussed or not—and, conversely, were there effectively disclosure of the act of "sensing", such a disclosure should be understood to encompass disclosure of a "sensor" and even a "means for sensing". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the temperature sensors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A temperature sensor, comprising:
a reversible thermochromic color-changing system comprising:
a dye;
a developer; and
a solvent;
wherein upon exposure to a preselected temperature threshold, association or disassociation of said dye and said developer results in a visible color change;
wherein said color-changing system comprises a color-memory property which facilitates retention of said color change to record said exposure to said temperature threshold; and
wherein said solvent comprises a mixture of (i) one ester having Formula I and a first R group and another said ester having Formula I and a second R group which is different from said first R group, (ii) one said ester having Formula III and another said ester having Formula IV, or (iii) one said ester having Formula VII and another said ester having Formula VIII:

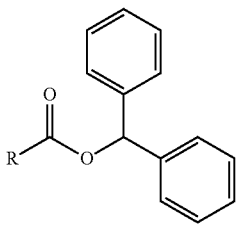

Formula I wherein R in Formula I can be (i) a straight-chain or branched alkyl group, (ii) a straight-chain or branched alkenyl group, or (iii) a straight-chain or branched alkynyl group, wherein any of said groups can be unsubstituted or substituted; and
wherein R in Formula I can have 5, 7, 9, 11, 13, or 19 carbon atoms;

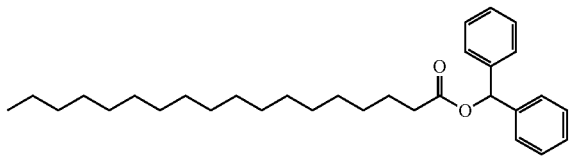

Formula III

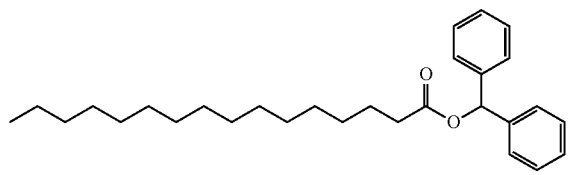

Formula IV

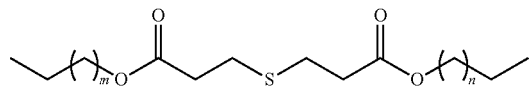

Formula VII wherein m and n in Formula VII can each be an integer between 1 and 15; and

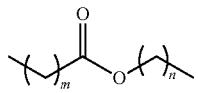

Formula VIII wherein m and n in Formula VIII can each be an integer between 2 and 15.

2. The temperature sensor of claim 1, wherein said dye comprises a leuco dye which reversibly changes between a substantially colorless state and a visibly colored state.

3. The temperature sensor of claim 2, wherein said color-changing system comprises:
a coloration temperature at which said leuco dye changes to said colored state; and
a decoloration temperature at which said leuco dye changes from said colored state;
wherein said coloration temperature differs from said decoloration temperature.

4. The temperature sensor of claim 3, wherein said coloration temperature is less than said decoloration temperature.

5. The temperature sensor of claim 3, wherein said coloration temperature differs from said decoloration temperature by between about 40 Celsius degrees to about 100 Celsius degrees.

6. The temperature sensor of claim 3, wherein said coloration temperature differs from said decoloration temperature by between about 45 Celsius degrees to about 100 Celsius degrees.

7. The temperature sensor of claim 3, wherein said coloration temperature differs from said decoloration temperature by between about 50 Celsius degrees to about 100 Celsius degrees.

8. The temperature sensor of claim 3, wherein said color-changing system comprises:
a coloration temperature at which said leuco dye changes to said colored state; and
a decoloration temperature at which said leuco dye changes to said colorless state;
wherein said coloration temperature differs from said decoloration temperature.

9. The temperature sensor of claim 1, wherein said color-changing system is contained such that said dye, said developer, and said solvent are encapsulated together.

10. The temperature sensor of claim 1, wherein said color-changing system is encapsulated within a capsule to provide an encapsulated color-changing system.

11. The temperature sensor of claim 1, wherein said color-changing system is encapsulated within a microcapsule to provide a microencapsulated color-changing system.

12. The temperature sensor of claim 1, wherein said color-changing system is incorporated into a coating.

13. The temperature sensor of claim 1, wherein said color-changing system is incorporated into an ink.

14. The temperature sensor of claim 13, wherein said ink is formulated for application to a substrate via printing.

15. The temperature sensor of claim 13, wherein said ink is formulated for application to a substrate via medium-speed printing or high-speed printing.

* * * * *